United States Patent
Yamamoto et al.

(10) Patent No.: US 9,313,958 B2
(45) Date of Patent: Apr. 19, 2016

(54) HIGH ZINC-CONTAINING LEGUMES

(75) Inventors: Hideaki Yamamoto, Kato-gun (JP); Masahiko Yamamoto, Kato-gun (JP); Hiroshi Soejima, Ebetsu (JP); Hideshi Shinoda, Sapporo (JP); Masanobu Ohashi, Chitose (JP); Yoshihiko Katsuragawa, Ebetsu (JP)

(73) Assignee: SNOW BRAND SEED CO., LTD., Sapporo-shi (JP)

( * ) Notice: Subject to any disclaimer, the term of this patent is extended or adjusted under 35 U.S.C. 154(b) by 925 days.

(21) Appl. No.: 12/520,874

(22) PCT Filed: Dec. 26, 2007

(86) PCT No.: PCT/JP2007/001469
§ 371 (c)(1),
(2), (4) Date: Jun. 23, 2009

(87) PCT Pub. No.: WO2008/081584
PCT Pub. Date: Jul. 10, 2008

(65) Prior Publication Data
US 2010/0092653 A1  Apr. 15, 2010

(30) Foreign Application Priority Data
Dec. 27, 2006 (JP) .................................. 2006-353227

(51) Int. Cl.
*A01G 7/00* (2006.01)

(52) U.S. Cl.
CPC ......................................... *A01G 7/00* (2013.01)

(58) Field of Classification Search
None
See application file for complete search history.

(56) References Cited

U.S. PATENT DOCUMENTS 5,201,930 A * 4/1993 Campbell .......................... 71/23
5,667,795 A * 9/1997 Fraley et al. .................. 424/405

FOREIGN PATENT DOCUMENTS

| CN | 1404714 A | 3/2003 |
|---|---|---|
| JP | 3 160929 | 7/1991 |
| JP | 5 330968 | 12/1993 |
| JP | 6 24884 | 2/1994 |
| JP | 2001 142 | 1/2001 |
| JP | 2002 3291 | 1/2002 |
| JP | 2002 212084 | 7/2002 |
| JP | 2002 255712 | 9/2002 |
| JP | 2002 322073 | 11/2002 |
| JP | 2003 9665 | 1/2003 |

OTHER PUBLICATIONS

House et al 2002, Journal of the Science of Food and Agriculture 82: 1452-1457.*
Cichy et al Mar. 2005, Crop Science 45: 864-870.*
Yanming et al 2004, Spectroscopy and Spectral Analysis 24(11): 1454-1457 Translation filed by Applicant.*
Shute et al. (Science of the Total Environment, (2006), 371, pp. 63-73).*
Herawati et al. (Bull. Environ. Contam. Toxicol., (2000), 64, pp. 33-39).*
Hiroshi Sakurai, et al., "Bioinorganic Chemistry [Second edition]", Hirokawa Publishing Co., ISSN: 4-567-21002-6, 1993, p. 1, lines 1-6 (With Partial English Translation).
Hiroshi Tomita, "Secrets of Mineral Zinc Power for Attaining Health", Ohzora Publishing Co., IBSN: 4-87287-935-X, 1998, p. 48, lines 1-3 and 8-10 (With Partial English Translation).
Yoshiko Kagawa, Standard Tables of Food Composition in Japan, Fifth revised, 2003), Kagawa Nutrition University Publishing Division, 2003, Higlighted portions of pp. 176-177 and pp. 196-197. (Relevant Portions are Written in English).
Sunita A. Ramesh, et al., "Over-expression of an Arabidopsis zinc transporter in Hordum vulgare increases short-term zinc uptake after zinc deprivation and seed zinc content", Plant Molecular Biology, vol. 54, 2004, pp. 373-385.
Erin L. Connolly, et al., "Expression of the IRT1 Metal Transporter Is Controlled by Metals at the Levels of Transcript and Protein Accumulation", The Plant Cell, vol. 14, Jun. 2002, pp. 1347-1357.
Horst Marschner, "Mineral Nutrition of Higher Plants, $2^{nd}$ ed.", Academic Press, ISBN: 0-12-473543-6 (PB), 1995, Highlighted portions of p. 97.
Liu Yanming, et al., "Determination of Trace Elements in Soybean and Its Products by Atomic Absorption Spectrometry", China Academic Journal Electronic Publishing House, vol. 24, No. 11, Nov. 30, 2004, pp. 1454-1457 (with English translation).
Yuan Qingxiang, et al., "Determination of Trace Elements in Semen Phaseoli by Microwave Digestion-Atomic Absorption Spectrometry", China Academic Journal Electronic Publishing House, No. 11, Sep. 30, 2006, p. 45 (with English translation).
Office Action issued Sep. 27, 2010, in Chinese Patent Application No. 200780047990.2 with English translation.

* cited by examiner

*Primary Examiner* — David T Fox
*Assistant Examiner* — Jared Shapiro
(74) *Attorney, Agent, or Firm* — Oblon, McClelland, Maier & Neustadt, L.L.P.

(57) ABSTRACT

Provided are a legume containing high concentrations of zinc in the grains, and a method for producing the same. Provided are also grains of a legume, except adzuki bean, containing 5.5 mg/100 g or more of zinc, and a method for producing a legume containing 4.0 mg/100 g or more of zinc in the grains, the method including spraying a solution containing zinc at a concentration of 0.01 to 2% by weight, on the leaves or the raceme regions, starting from the flower bud stage of the legume.

11 Claims, No Drawings

HIGH ZINC-CONTAINING LEGUMES

BACKGROUND OF THE INVENTION

1. Field of the Invention

The present invention relates to legumes which contain high concentrations of zinc in the grain, and are therefore useful as foods and as foodstuffs, and a method for producing the same.

2. Description of the Related Art

In order for a human being to sustain life, trace metal elements such as iron (Fe), copper (Cu), zinc (Zn), manganese (Mn), cobalt (Co), molybdenum (Mo), vanadium (V), selenium (Se), chromium (Cr), nickel (Ni), iodine (I), silicon (Si), fluorine (F), arsenic (As) and lead (Pb) need to be taken in from external sources, and these elements are called essential elements (Sakurai and Tanaka, eds. (1993), Bioinorganic Chemistry, Hirokawa-book-store). Among them, zinc (Zn) occupies the second largest portion of the trace metal elements contained in the human body, next to iron. Zinc is contained in important enzymes such as carboxypeptidases, carboxylate dehydrogenases and alcohol dehydrogenases, and is known to be responsible for roles important in the metabolic system of the body. It is also known that if zinc is deficient, growth disorder, decreased sexual function, impairment of the skin or hair, taste disturbance and the like are exhibited, thus causing problems. Moreover, while the daily zinc requirement for adult is known to be 12 to 15 mg, it is assumed that only about 9 mg of zinc per day can be taken in from an average Japanese meal. Thus, zinc deficiency in Japanese people has been regarded as a social issue (Tomita (1998), Secrets of Mineral Zinc Power for Attaining Health, Ohzora Publishing, Co.). In this regard, measures have been taken by public agencies, such as that in 2002, the Ministry of Health, Labor and Welfare in Japan added zinc as a component of the food with nutrient function claims, and in 2004, the Ministry of Education, Culture, Sports, Science and Technology in Japan established a target level for the zinc content in school meals.

As discussed above, since zinc (Zn) is important for the human body to carry on vital activities, it is desired to take a proper amount of zinc from daily meals. However, foods containing these elements to high levels are relatively limited. For example, zinc (Zn) is contained in oyster and cow liver to high concentrations such as 13.2 mg/100 g and 3.8 mg/100 g, respectively (Kagawa (ed. supervisor) (2003), "Tables of Food Composition, Fifth Revised, 2003," Kagawa Nutrition University Publishing Division). However, from the standpoint of the current eating habits of Japanese people, it cannot be said that daily intake of such foodstuffs is common. On the contrary, Japanese people have an eating habit of routinely ingesting legumes. For example, soybean can be said to be a foodstuff that can be comfortably taken in almost everyday, in the form of cooked beans as well as processed food products including soy sauce, soybean paste (miso), tofu, natto and the like. Also, cowpea, soybean, alfalfa and the like can also be comfortably taken in the form of sprouts. From this point of view, it is envisaged that it will be useful to increase the contents of these trace metal elements in legumes. However, in the technical field related to the method for cultivating legumes, although the research concerning trace metal elements is being conducted through the minimum necessary research on the method for fertilization or the like, a sufficient level has not been reached regarding the technology of actively incorporating the trace metal elements into the edible parts.

Although rye does not belong to the legumes, recently there has been developed a technology of overexpressing Arabidopsis-derived zinc transporter gene through genetic engineering, to increase the zinc content in the grains of rye. However, even though this genetically engineered crop was fertilized with zinc, the zinc absorption rate was not elevated (Ramesh, et al. (2004), Plant Mol. Biol). The reason for this is contemplated to be because although zinc transporter gene is expressed, in the presence of zinc, the zinc transporter seems to be perceived as another metal transporter protein (Connoly, et al. (2002), Plant Cell), and thus the zinc transporter protein is eliminated by post-translational regulation. As such, despite the use of the genetic engineering technology which is a leading-edge technology at present, it is still difficult to make trace metal elements such as zinc to be transported into the edible part of crops.

Furthermore, as one of conventional fertilization techniques, a foliar spraying method has been used practically. Since this method is capable of incorporating fertilizer components into the cells which are brought into contact with the spray liquid, the method has been said to prevent or ameliorate the element deficiency symptoms in the leaves. However, there has been no report on a technology of accumulating a high concentration of a metal element in the seeds, which have no chance to be brought into direct contact with the spray liquid, by translocating the metal element from the leaves to the seeds, that is, by transferring the metal elements through a plurality of cells. Particularly, since zinc is not an element which is likely to be translocated, such as nitrogen, phosphorus, potassium or magnesium (Marschner (1995), Mineral Nutrition of Higher Plants, 2nd ed., Academic Press), it was difficult with the conventional foliar spraying method to accumulate zinc in the seeds to a high concentration.

SUMMARY OF THE INVENTION

The present invention provides legumes containing high concentrations of zinc in the edible parts thereof, that is, in the grains, and a method for producing the same.

The inventors of the present invention conducted extensive investigation so as to incorporate high concentrations of zinc into the grains of a legume, and as a result, they completely surprisingly found that when a zinc-containing solution is sprayed on the leaves and the raceme regions, zinc is introduced into the grains at higher concentrations compared to the case where the zinc-containing solution is applied to soil, and there can be obtained a legume containing zinc in the grains at a high concentration which could not be obtained hitherto. Thus, the inventors completed the present invention.

Specifically, the present invention relates to the following items (1) to (22).

(1) Ripe grains of a legume, other than adzuki bean, containing 5.5 mg/100 g or more of zinc.

(2) The ripe grains of the legume according to (1) above, wherein the zinc content is 5.5 to 15.0 mg/100 g.

(3) The ripe grains of the legume according to (1) or (2) above, wherein the legume is selected from soybean (*Glycine max*), kidney bean (*Phaseolus vulgaris*), broad bean (*Vicia faba*), pea (*Pisum sativum*), cowpea (*Vigna unguiculata*), peanut (*Arachis hypogaea*), hyacinth bean (*Dolichos lablab*), sword bean (*Canavalia gladiata*), lima bean (*Phaseolus lunatus*), winged bean (*Psophocarpus tetragonolobus*), lentil (*Lens esculenta*), chickpea (*Cicer arietinum*), mung bean (*Vigna radiata*), *Glycine soja, Glycine formosana*, alfalfa (*Medicago sativa*), white lupine (*Lupinus albus*), narrowleaf lupine (*Lupinus angustifolius*), yellow lupine (*Lupinus luteus*) and Egyptian lupine (*Lupinus termis*).

(4) Ripe grains of adzuki bean containing 4.0 mg/100 g or more of zinc.

(5) The ripe grains of adzuki bean according to (4) above, wherein the zinc content is 4.0 to 10.0 mg/100 g.

(6) Immature grains of soybean, immature grains of kidney bean, immature grains of pea or immature grains of broad bean, containing 2.0 mg/100 g (fresh weight) or more of zinc.

(7) The immature grains of soybean, immature grains of kidney bean, immature grains of pea or immature grains of broad bean according to (6) above, wherein the zinc content is 2.0 to 10.0 mg/100 g (fresh weight).

(8) A method for producing a legume, other than adzuki bean, containing 5.5 mg/100 g or more of zinc in the ripe grains, the method including spraying a liquid containing zinc at a concentration of 0.01 to 2% by weight on the leaves or the raceme regions, starting from the flower bud stage of the legume.

(9) A method for producing adzuki bean containing 4.0 mg/100 g or more of zinc in the grains, the method including spraying a liquid containing zinc at a concentration of 0.01 to 2% by weight on the leaves or the raceme regions, starting from the flower bud stage of adzuki bean.

(10) A method for producing a legume selected from immature grains of soybean, immature grains of kidney bean, immature grains of pea and immature grains of broad bean, the legume containing 2.0 mg/100 g (fresh weight) or more of zinc in the immature grains, the method including spraying a liquid containing zinc at a concentration of 0.01 to 2% by weight on the leaves or the raceme regions, starting from the flower bud stage of the legume.

(11) The production method according to any one of (8) to (10) above, wherein the solution containing zinc further contains a seaweed extract.

(12) The production method according to any one of (8) to (11) above, wherein the spray amount of the solution containing zinc is 1000 liters or more per hectare.

(13) The production method according to any one of (8) to (12) above, wherein spray of the solution containing zinc is performed, starting from the flower bud stage, at an interval of 1 to 2 weeks.

(14) The production method according to (8) above, wherein the zinc content in the ripe grains is 5.5 to 15.0 mg/100 g.

(15) The production method according to (8) or (9) above, wherein the legume is selected from soybean (*Glycine max*), kidney bean (*Phaseolus vulgaris*), broad bean (*Vicia faba*), pea (*Pisum sativum*), cowpea (*Vigna unguiculata*), peanut (*Arachis hypogaea*), hyacinth bean (*Dolichos lablab*), sword bean (*Canavalia gladiata*), lima bean (*Phaseolus lunatus*), winged bean (*Psophocarpus tetragonolobus*), lentil (*Lens esculenta*), chickpea (*Cicer arietinum*), mung bean (*Vigna radiata*), *Glycine soja, Glycine formosana*, alfalfa (*Medicago sativa*), white lupine (*Lupinus albus*), narrowleaf lupine (*Lupinus angustifolius*), yellow lupine (*Lupinus luteus*) and Egyptian lupine (*Lupinus termis*).

(16) A material for producing a legume, other than adzuki bean, containing 5.5 mg/100 g or more of zinc in the ripe grains, which material is a solution containing zinc at a concentration of 0.01 to 2% by weight, and is sprayed on the leaves or the raceme regions of the legume other than adzuki bean.

(17) The material according to (16) above, which further contains a seaweed extract.

(18) The material according to (16) or (17) above, wherein the legume is selected from soybean (*Glycine max*), kidney bean (*Phaseolus vulgaris*), broad bean (*Vicia faba*), pea (*Pisum sativum*), cowpea (*Vigna unguiculata*), peanut (*Arachis hypogaea*), hyacinth bean (*Dolichos lablab*), sword bean (*Canavalia gladiata*), lima bean (*Phaseolus lunatus*), winged bean (*Psophocarpus tetragonolobus*), lentil (*Lens esculenta*), chick pea (*Cicer arietinum*), mung bean (*Vigna radiata*), *Glycine soja, Glycine formosana*, alfalfa (*Medicago sativa*), white lupine (*Lupinus albus*), narrowleaf lupine (*Lupinus angustifolius*), yellow lupine (*Lupinus luteus*) and Egyptian lupine (*Lupinus termis*).

(19) A material for producing adzuki bean containing 4.0 mg/100 g or more of zinc in the ripe grains, which material is a solution containing zinc at a concentration of 0.01 to 2% by weight, and is sprayed on the leaves or the raceme regions of adzuki bean.

(20) The material according to (19) above, which further contains a seaweed extract.

(21) A material for producing a legume selected from immature grains of soybean, immature grains of kidney bean, immature grains of pea and immature grains of broad bean, the legume containing 2.0 mg/100 g (fresh weight) or more of zinc in the immature grains, which material is a solution containing zinc at a concentration of 0.01 to 2% by weight, and is sprayed on the leaves or the raceme regions of the legume.

(22) The material according to (21) above, which further contains a seaweed extract.

The legume grains of the present invention contain zinc at a high concentration that could not be produced hitherto even by genetic engineering techniques, and thus are useful as a highly nutritious food and foodstuff.

Furthermore, since the method for the production of a legume of the present invention is not to be applied to soil, but to be sprayed on the leaves or the like, the problem that is considered to occur when soil is fertilized with large amounts of zinc, in which zinc is said to inhibit the absorption and transfer of iron in the soil, and cause iron deficiency symptoms (heavy metal-induced chlorosis) (Kumazawa and Nishizawa (1976), Nutrient Uptake of Plant, Tokyo University Press), does not occur. Furthermore, when zinc is applied to soil in large amounts, runoff to rivers raises an environmental problem. For example, although the zinc concentration standard in rivers or seawater in Japan is set to 10 to 30 µg/L or lower according to the revision of the Basic Environment Law in 2003, when the method of the present invention is used, such problem does not occur.

DESCRIPTION OF THE PREFERRED EMBODIMENTS

The ripe grains of a legume, other than adzuki bean, of the present invention contain zinc at a concentration of 5.5 mg/100 g or more. Typically, the zinc concentration in ripe legume grains is considered to be 2.3 to 4.5 mg/100 g, and ripe legume grains containing such high concentrations of zinc as in the case of the present invention, are not known. The zinc concentration in the ripe legume grains is more preferably 5.5 to 15.0 mg/100 g, and particularly preferably 6.0 to 8.5 mg/100 g. Here, the zinc concentration can be measured by an atomic absorption spectrometry method, an ICP emission analysis method, an ICP mass analysis method or the like, and this concentration is the zinc content (mg) in 100 g of dried product.

According to the present invention, ripe legumes include soybean (*Glycine max*), kidney bean (*Phaseolus vulgaris*), broad bean (*Vicia faba*), pea (*Pisum sativum*), cowpea (*Vigna unguiculata*), peanut (*Arachis hypogaea*), hyacinth bean (*Dolichos lablab*), sword bean (*Canavalia gladiata*), lima bean (*Phaseolus lunatus*), winged bean (*Psophocarpus tetragonolobus), lentil (*Lens esculenta*), chick pea (*Cicer arietinum*), mung bean (*Vigna radiata*), *Glycine soja*, *Glycine formosana*, alfalfa (*Medicago sativa*), white lupine (*Lupinus albus*), narrowleaf lupine (*Lupinus angustifolius*), yellow lupine (*Lupinus luteus*), Egyptian lupine (*Lupinus termis*) and the like, but among these, soybean, kidney bean, broad bean and pea are preferred, with soybean being more preferred. Here, soybean includes common soybean, small soybean for natto, black soybean, green soybean, green beans, brown bean, Kuragake soybean, green pod soybean with edible immature grains (edamame), and Dadacha bean.

The ripe grains of adzuki bean of the present invention contain 4.0 mg/100 g or more of zinc. Typically, the zinc concentration in ripe adzuki bean is considered to be 2.3 mg/100 g, and ripe grains of adzuki bean containing such high concentrations of zinc as in the case of the present invention, are not known. The zinc concentration in the ripe grains of adzuki bean is more preferably 4.0 to 10.0 mg/100 g, and even more preferably 4.0 to 8.5 mg/100 g. Here, adzuki bean corresponds to *Vigna angularis*.

The immature grains of soybean (edible parts of green pod soybean), immature grains of kidney bean (edible parts of pod kidney bean), immature grains of pea (edible parts of green pea) or immature grains of broad bean (edible parts of broad bean) of the present invention contain 2.0 mg/100 g (fresh weight) or more of zinc. So far, immature grains of these beans containing such high concentrations of zinc are not known. The zinc concentration in these immature grains is more preferably 2.0 to 10.0 mg/100 g, and even more preferably 2.0 to 8.5 mg/100 g.

The legumes containing high concentrations of zinc in the grains of the present invention can be produced by spraying a solution containing zinc at a concentration of 0.01 to 2% by weight, on the leaves or the raceme regions, starting from the flower bud stage of the legume. Hereinafter, the legumes with regard to the production method and the material for the production of legume include adzuki bean as well as immature grains.

According to the investigation of the inventors of the present invention, it was found that in order to make legume grains absorb high concentrations of zinc, it is preferable to spray on the leaves or the raceme regions, rather than spraying on soil. Therefore, a solution which contains zinc at a concentration of 0.01 to 2% by weight, and is sprayed on the leaves or the raceme regions of the legume, is useful as a material for the production of a legume containing 5.5 to 15.0 mg/100 g or more of zinc in the grains.

The solution used for spraying (hereinafter, may also be referred to as a material for foliar spray) is preferably a solution containing zinc at a concentration of 0.01 to 2% by weight. The zinc used for preparing the solution is not particularly limited as long as it is water-soluble, and examples thereof include zinc sulfate, zinc chloride, zinc nitrate, zinc formate, zinc acetate, chelated zinc such as zinc EDTA, and the like. Among these, zinc sulfate is more preferred from the viewpoint of zinc transferability to the grains.

The zinc concentration in the material for foliar spray is preferably 0.02 to 1% by weight, and more preferably 0.1 to 0.5% by weight, in terms of zinc.

Furthermore, if the material for foliar spray used in the present invention contains a seaweed extract, the zinc transfer rate to the legume grains is improved. As for the seaweed, brown algae are preferred, and among them, the order Laminariales is preferred. The family Alariaceae is even more preferred. The most appropriate is Ainu-wakame (*Alaria praelonga*). Extracts of these seaweeds may contain water, or may be dried; however, on considering the ease of handling, dried products are preferred.

The content of the seaweed extract in the material for foliar spray is preferably 0.1 to 20% by weight, more preferably 1 to 10% by weight, and even more preferably 3 to 5% by weight, in terms of the dried product.

The seaweed extract can be prepared, for example, in the following manner. The raw material seaweed is subjected to hydrolysis by adding an acid such as a dilute aqueous solution of sulfuric acid or a dilute aqueous solution of hydrochloric acid, and heating the mixture to 60° C. or above. In this case, the type of the acid used is preferably sulfuric acid, and the concentration is preferably 0.5 to 2 N. The temperature for the heating is preferably the temperature at which the system boils up at the speed of the degradation rate. The obtained hydrolysate is adjusted for pH by adding an appropriate alkali, and then solids are removed therefrom by centrifugation or filtration, to thus obtain a seaweed extract. To obtain a desirable material for foliar spray, an appropriate amount of zinc may be added to this seaweed extract itself or a dilution thereof.

For the material for foliar spray, it is preferable to add a spreading agent or surfactant that is conventionally used in the agricultural field, in order to increase the adherence to the leaves and the raceme regions. The spreading agent or surfactant to be used is not particularly limited, but for the surfactant, all of nonionic, anionic, cationic and zwitterionic surfactants can be used. For example, polyoxyethylene alkyl ethers, polyoxyethylene alkyl aryl ethers, polyoxyethylene fatty acid esters, sorbitan fatty acid esters, polyoxyethylene sorbitan fatty acid esters, oxyethylene polymers, oxypropylene polymers, polyoxyethylene alkyl phosphoric acid esters, fatty acid salts, alkyl sulfate ester salts, alkyl sulfonate salts, alkylaryl sulfonate salts, alkyl phosphate salts, alkyl phosphate ester salts, polyoxyethylene alkyl sulfate esters, quaternary ammonium salts, oxyalkylamines, lecithins, saponin and the like may be mentioned. Furthermore, if necessary, gelatin, casein, starch, agar, polyvinyl alcohol, sodium alginate and the like can be used as auxiliary agents.

In the case of spraying a material for foliar spray, the material may be mixed with a fertilizer for foliar spray that is conventionally used in the agricultural field. In this case, the fertilizer components are not particularly limited, but those exhibiting alkalinity after dissolution are not preferable because zinc undergoes precipitation in the form of salts. Examples of preferred fertilizer components in the case of mixing with the material include urea, ammonium phosphate, ammonium hydrochloride, ammonium sulfate, phosphoric acid, pyrophosphoric acid and the like. Among them, combined use of urea may increase the absorption amount of zinc, and thus is preferred (Mortvedt and Gilkes (1993). Zinc fertilizer. "Zinc in soils and plants," Kluwer academic publishers).

In the case of cultivating the legumes of the present invention, the basal fertilization and additional fertilization may be carried out according to the fertilizer application rate and the fertilizer application method employed in that area. However, it is needless to say that treating the soil with zinc can slightly further increase the zinc content in the grains.

In the case of cultivating the legumes of the present invention, the density of planting may be a density recommended in that area, but it is preferable to set the furrow spacing (inter-row spacing) to be 30 cm or longer, so that the material for foliar spray can easily reach to the raceme region. Furthermore, in the case of setting the zinc concentration in the material for foliar spray to be 0.1% by weight or more, it is preferable to increase the density of planting by 1.2 to 2 times the conventional density, for the purpose of mitigating the yield reduction. In this case, it is preferable to narrow the furrow spacing (inter-row spacing) or the planting interval, rather than increasing the number of sowing seeds per one planting.

As for the method of spraying the material for foliar spray, it is preferable to spray so that the material for foliar spray spreads to the raceme regions. In the case of spraying manually, it is preferable to operate the spray nozzle for the material for foliar spray is directed toward the raceme regions. Also, in the case of using a boom sprayer, it is preferable to set the amount of the spray solution to 1000 liters or more per hectare, preferably 1000 to 3000 liters per hectare, and more preferably 1200 to 2000 liters per hectare. In this case, the pressure of the atomizer is preferably set slightly higher, for example, to 2 to 3 MPa. Furthermore, it is needless to mention the advantages of using a device which would reduce the particle size of the liquid to be atomized, such as by making the spray aperture smaller, or the like. It is also preferable to use a so-called electrostatic atomizer or an electrostatic atomizing nozzle, which promotes adhesion of the atomized liquid to the plant body by using static electricity.

The timing for spraying the material for foliar spray may be favorably a time period spanning from the flower bud stage to the stage of pod yellowing, and particularly preferably a time period spanning from the stage of pod development to the stage immediately before pod yellowing. The interval of spraying the material for foliar spray is preferably once a day to once in two weeks. Moreover, it is more preferable to spray once in one week to two weeks. The total number of spray during the crop growth period is preferably 2 to 7 times.

EXAMPLES

Hereinafter, the present invention will be described in more detail by way of Examples, but the present invention is not intended to be limited to the following Examples.

Preparation Example 1

Preparation of Seaweed Extract

Dried products of Ainu-wakame (*Alaria praelonga*), *Alaria crassifolia*, sea tangle (*Laminaria japonica*) and *Costaria costata* were each shredded with scissors to a length of 5 cm. To 450 g of each of these shredded products, 2,550 mL of 1 N sulfuric acid was added, and the mixture was boiled up while stirring for 2 hours. The obtained liquid was cooled by inserting the container into crushed ice, and then was centrifuged in a centrifuge at 8,000 G for 60 minutes. 1.5 L of the resulting supernatant was diluted with 1 L of added water, and 2.5 kg of zinc sulfate heptahydrate was added and dissolved therein. Potassium hydroxide was added to this solution, and the mixture was adjusted to pH 2.0. Among these, such a product which was prepared from Ainu-wakame as the raw material, will be heretofore referred to as zinc-containing Ainu-wakame extract. In addition, since the zinc content in the actual material of Ainu-wakame is 2.34 mg/kg, the content of the zinc originating from Ainu-wakame itself in the zinc-containing Ainu-wakame extract is only 0.11 mg/kg, and thus is substantially negligible.

Example 1

A soybean species for green pod soybean, "Haru-no-mai" (Snow Brand Seed Co., Ltd.), was cultivated in the experimental field belonging to the Technical Research Institute of Snow Brand Seed Co., Ltd. in Ebetsu-shi, Hokkaido. For the basal fertilization, 50 kg/ha of nitrogen, 200 kg/ha of phosphate and 117 kg/ha of potassium were applied, and at the same time, there were provided a control section where no zinc was added, sections where zinc sulfate ($ZnSO_4$) was applied in the amounts of 5.7, 11.4, 22.8 and 45.8 kg/ha in terms of zinc content, and sections where zinc oxide (ZnO) was applied in the amounts of 20.6, 41.2, 82.4 and 164.7 kg/ha in terms of zinc content. The density of planting was 60 cm×20 cm, with one individual plant per one planting. Seed sowing was performed on 26th, June. During cultivation, on 22nd, August, which time was corresponding to the stage of pod development, a 0.5% aqueous solution of zinc sulfate heptahydrate (0.11% in terms of zinc concentration) added with 0.1% of Approach BI (manufactured by Kao Corporation), a spreading agent containing polyoxyethylene hexitan fatty acid esters, was foliar-sprayed at a rate of 150 mL/$m^2$ to a half portion of the area of each of the treated sections. Foliar spray was performed using a knapsack power sprayer, SHR061 (manufactured by Kioritz Corporation, Ltd.), such that a sufficient amount of the liquid agent could reach evenly to the raceme region. The test was repeated twice for each treatment.

Sampling was conducted on 25th, September, which time was corresponding to an adequate time for harvesting green pod soybean. The pod was removed, the grains inside (edible parts) were separated, their fresh weight was measured, and the grains were dried in a dryer at 90° C. for 3 days. The grains after the drying were rapidly measured for dry weights, to thereby calculate the dry weight ratio. The dried grains were ground with an ultracentrifuge grinder, MRK-RETSCH (manufactured by Mitamura Riken Kogyo, Inc.), and then 0.5 g was weighed. 5 mL of nitric acid for precision analysis (manufactured by Wako Pure Chemical Industries, Ltd.) was added to the weighed sample, and the sample was degraded in a Teflon (registered trademark) sealed pressurized degradation vessel. The degraded solution was metered to a constant volume, and the solution was subjected to the measurement of zinc content using an ICP emission spectrometry apparatus, SPS4000 (manufactured by Seiko Instruments, Inc.). The quantitative value was calculated back using the dry weight ratio, and thereby the zinc content per fresh weight was calculated.

The results are presented in Table 1. When compared with the section where zinc sulfate was applied to soil and no foliar spray was performed, the highest zinc content in the grains was obtained from the section applied with 45.8 kg/ha of zinc, where the zinc content in the grains was 1.91 mg/100 g, this value being 30% higher than that for the section with no application. When compared with the section where zinc oxide was applied to soil and no foliar spray was performed, the highest zinc content in the grains was obtained from the section applied with 41.2 kg/ha of zinc, but the zinc content in the grains was only 1.69 mg/100 g (the reason for a superior effect of zinc sulfate compared to zinc oxide is conceived to be because the water-solubility of zinc sulfate is much higher than that of zinc oxide). However, the zinc content in the grains for the section where zinc was not applied to soil but was only foliar-sprayed, was 2.06 mg/100 g, which value is higher than any of the sections of soil application. In addition, the amount of zinc used for the foliar spray treatment was merely 1.65 kg even in terms of the amount per hectare, and even from this, it was obvious that the foliar spray treatment was effective. Furthermore, for all of the sections where zinc was applied to soil and also foliar-sprayed, the zinc contents in the grains were higher than those for the sections of no foliar spray. This result also shows that in the case of incorporating zinc into the grains, it is more effective to perform foliar spray than to perform soil application.

TABLE 1

| Zinc applied to soil | Amount of zinc applied to soil (kg/ha) | Zinc content in grains (edible parts) (mg/100 g) | | Ratio with respect to untreated section (%) |
|---|---|---|---|---|
| | | Section of no spraying* | Section of zinc foliar spray* | |
| No application | 0 | 1.48 (100) | 2.06 (140) | 139 |
| Zinc sulfate | 5.7 | 1.50 (101) | 1.79 (121) | 119 |
| Zinc sulfate | 11.4 | 1.57 (107) | 1.84 (125) | 117 |
| Zinc sulfate | 22.8 | 1.67 (113) | 1.92 (130) | 115 |
| Zinc sulfate | 45.8 | 1.91 (130) | 2.11 (143) | 110 |
| Zinc oxide | 20.6 | 1.49 (101) | 1.83 (124) | 123 |
| Zinc oxide | 41.2 | 1.69 (115) | 2.10 (143) | 124 |
| Zinc oxide | 82.4 | 1.61 (109) | 1.85 (125) | 115 |
| Zinc oxide | 164.7 | 1.59 (107) | 2.10 (142) | 132 |

*The numerical values within the parentheses are ratios calculated by taking the value for the section where zinc was neither applied to soil nor foliar-sprayed, as 100.

Example 2

An adzuki bean species, "Erimoshouzu", was cultivated in the field of Nemuro-cho, Obihiro-shi, Hokkaido. The basal fertilization was carried out according to the standards for fertilization described in the "Hokkaido Fertilization Guide" (Hokkaido Agricultural Policy Planning Department Edition, 2002, Hokkaido Agricultural Development and Extension Association Corporation). Seed sowing was performed on 20th, May. The density of planting was 66 cm×20 cm, with two individual plants per one planting. On 14th, August, which time was corresponding to the flowering stage, there were provided sections where zinc sulfate ($ZnSO_4$) was applied to soil at zinc contents of 5.5, 11 and 22 kg/ha, and sections where 0.5, 1, 2, 3, 4 and 5% aqueous solutions of zinc sulfate heptahydrate (0.11, 0.22, 0.44, 0.66, 0.88 and 1.1%, respectively, in terms of zinc concentration) added with 0.1% of Approach BI (manufactured by Kao Corporation), a spreading agent containing polyoxyethylene hexitan fatty acid esters, were foliar-sprayed at a rate of 150 mL/m². The method of foliar spray was the same as in Example 1. Also, for the sections treated with 0.5 and 1% aqueous solutions of zinc sulfate heptahydrate (0.11 and 0.22%, respectively, in terms of zinc concentration), the same spray was performed on 29th, August. The test was repeated twice for each treatment.

Sampling was performed on 5th, October, which time was corresponding to the harvesting stage. The plants were air-dried, and then the grains were separated using a threshing machine. The obtained grains were ground and measured for the zinc content in the same manners as in Example 1.

The results are presented in Table 2. Among the sections treated with soil application of zinc, the highest zinc content in the grains was obtained from the section applied with 22 kg/ha of zinc, and the zinc content was 3.43 mg/100 g. In this regard, the zinc content in the grains for all of the sections treated with zinc foliar spray was higher than this value, and thus it was confirmed that foliar spray was effective for incorporating zinc into the grains of adzuki bean. Among them, the zinc content in the grains for the section treated twice with the 0.22% aqueous solution of zinc was 4.05 mg/100 g, and the zinc content in the grains for the section treated with the 1.1% aqueous solution of zinc was 4.07 mg/100 g, both being remarkably high. In addition, the average zinc content in cow liver is considered to be 3.8 mg/100 g according to the "Tables of Food Composition, Fifth Revised, 2003." From this point of view, it is proved that adzuki bean grains having a zinc content higher than that of cow liver were obtained by the zinc foliar spray of the present Example.

TABLE 2

| Amount of zinc applied to soil (kg/ha) | Concentration of foliar-sprayed zinc (%) | Number of foliar spray (times) | Zinc content in grains (mg/100 g) | Ratio with respect to untreated section (%) |
|---|---|---|---|---|
| 0 (Untreated section) | 0 (Untreated section) | 0 | 3.15 | 100 |
| 5.5 | 0 | 0 | 3.32 | 106 |
| 11 | 0 | 0 | 3.15 | 100 |
| 22 | 0 | 0 | 3.43 | 109 |
| 0 | 0.11 | 2 | 3.95 | 126 |
| 0 | 0.22 | 2 | 4.05 | 129 |
| 0 | 0.44 | 1 | 4.04 | 128 |
| 0 | 0.66 | 1 | 3.71 | 118 |
| 0 | 0.88 | 1 | 3.99 | 127 |
| 0 | 1.1 | 1 | 4.07 | 129 |

Example 3

A soybean species, "Haru-no-mai" (Snow Brand Seed Co., Ltd.), was cultivated in the greenhouse belonging to the Technical Research Institute of Snow Brand Seed Co., Ltd. in Ebetsu-shi, Hokkaido. Black pots made of polymer resin and having a diameter of 9 cm were filled with a potting soil, "Sukusuku Club 30" (Snow Brand Seed Co., Ltd.), and one grain was sowed per pot. Additional fertilization was applied starting after the flowering stage and until the leaves yellowed, with 0.1 g each of nitrogen, phosphate and potassium being applied per pot at every 10 days. After the stage of pod development, once a week, a 0.5% aqueous solution of zinc sulfate heptahydrate (0.11% in terms of zinc concentration) added with 0.1% of Approach BI (manufactured by Kao Corporation), a spreading agent containing polyoxyethylene hexitan fatty acid esters, was applied to the leaf blade, the pod surface, and on both thereof, using a brush for water paint. This treatment was carried out five times a week. Each treatment was repeated twice. After the plants completely died, the grains from each of the treated sections were sampled, and the obtained grains were ground and measured for the zinc content in the same manners as in Example 1.

The results are presented in Table 3. The zinc content in the grains was higher for the section treated with application to pod only, than for the section treated with application to leaf blade only. For legumes, it is general that the leaf surface area is larger than the pod surface area, and this applies to the case of the present sample species as well. Nevertheless, the zinc content in the grains was higher for the sections treated with application to pod only, than for the sections treated with application to leaf blade only, and from this, it is considered that a method of applying zinc by, for example, adhering the zinc on the pod surface, is efficient.

TABLE 3

|  | Zinc content in grains (mg/100 g) | Ratio with respect to untreated section (%) |
|---|---|---|
| Untreated section | 2.69 | 100 |
| Section treated with application to leaf blade only | 3.12 | 116 |
| Section treated with application to pod only | 3.21 | 119 |
| Section treated with application to leaf blade and pod | 3.39 | 126 |

Example 4

A soybean species, "Dance of Spring" (Snow Brand Seed Co., Ltd.), was cultivated in the greenhouse belonging to the Technical Research Institute of Snow Brand Seed Co., Ltd. in Ebetsu-shi, Hokkaido. Black pots made of polymer resin and having a diameter of 9 cm were filled with a potting soil, "Sukusuku Club 30" (Snow Brand Seed Co., Ltd.), and one grain was sowed per pot. Additional fertilization was applied starting after the flowering stage and until the leaves yellowed, with 0.1 g each of nitrogen, phosphate and potassium being applied per pot at every 10 days. After the flowering stage, at intervals of once in two weeks, once a week, and twice a week, 0.25%, 0.5% and 1% aqueous solutions of zinc sulfate heptahydrate (0.055%, 0.11% and 0.22%, respectively, in terms of zinc concentration) added with 0.1% of Approach BI (manufactured by Kao Corporation), a spreading agent containing polyoxyethylene hexitan fatty acid esters, were applied to the whole plant using a sprayer. Each treatment was repeated twice. After the plants completely died, the grains from each of the treated sections were sampled, and the obtained grains were ground and measured for the zinc content in the same manners as in Example 1.

The results are presented in Table 4. In the groups having the same concentration of foliar-sprayed zinc, the zinc content in the grains increased when the spraying interval was shorter, and the total number of spraying was higher. From this, it was found that multiple treatments are effective in increasing the zinc content in the grains.

TABLE 4

| Concentration of foliar-sprayed zinc (%) | Spraying interval | Total number of spraying | Zinc content in grains (mg/100 g) | Ratio with respect to untreated section (%) |
|---|---|---|---|---|
| 0 | — | — | 2.24 | 100 |
| 0.055 | Once in 2 weeks | 3 | 2.68 | 120 |
| 0.055 | Once in 1 week | 5 | 3.28 | 146 |
| 0.055 | Twice in 1 week* | 9 | 3.39 | 151 |
| 0.11 | Once in 2 weeks | 3 | 3.20 | 143 |
| 0.11 | Once in 1 week | 5 | 3.20 | 143 |
| 0.11 | Twice in 1 week* | 9 | 3.57 | 159 |
| 0.22 | Once in 2 weeks | 3 | 3.02 | 135 |
| 0.22 | Once in 1 week | 5 | 3.82 | 171 |
| 0.22 | Twice in 1 week* | 9 | 4.99 | 223 |

*Spraying was performed after 3 days from the first spraying and after 4 days from the second spraying, and this was repeated.

Example 5

Soybean species, "Suzumaru" and "Toyokomachi," were cultivated in the experimental field belonging to the Hokkaido Research Farm of Snow Brand Seed Co., Ltd. in Naganuma-cho, Hokkaido. For the basal fertilization, 24 kg/ha of nitrogen, 150 kg/ha of phosphate, 56 kg/ha of potassium and 20 kg/ha of magnesium were applied. The density of planting was 60 cm×20 cm, with two individual plants per one planting. Seed sowing was performed on 24th, May. During cultivation, on 30th, July, which time was corresponding to the flowering stage, and on 9th, August and 23rd, August, which times were corresponding to the stage of pod development, 0.25%, 0.5% and 1% aqueous solutions of zinc sulfate heptahydrate (0.055%, 0.11% and 0.22%, respectively, in terms of zinc concentration), and 0.5%, 1% and 2% aqueous solutions of the zinc-containing Ainu-wakame extract disclosed in Preparation Example 1 (likewise, 0.055%, 0.11% and 0.22%, respectively, in terms of zinc concentration) added with 0.1% of Approach BI (manufactured by Kao Corporation), a spreading agent containing polyoxyethylene hexitan fatty acid esters, were foliar-sprayed at a rate of 150 mL/m$^2$. Foliar spray was performed using a knapsack power sprayer, SHR061 (manufactured by Kioritz Corporation, Ltd.), such that a sufficient amount of the liquid agent could reach evenly to the raceme region. The test was repeated twice for each treatment.

Sampling was performed on 3rd, October, which time was corresponding to the harvesting stage. The plants were air-dried, and then the grains were separated using a threshing machine. The obtained grains were ground and measured for the zinc content in the same manners as in Example 1.

The results are presented in Table 5. When the products treated with zinc sulfate alone and the products treated with solutions added with the Ainu-wakame extract are compared, the zinc content in the grains increased in the products treated with solutions added with the Ainu-wakame extract. In addition, the average zinc content in cow liver is considered to be 3.8 mg/100 g according to the "Tables of Food Composition, Fifth Revised, 2003," and from this point of view, it is proved that Suzumaru having a zinc content 1.8 times or more higher than that of cow liver and Toyokomachi having a zinc content 2.1 times or more higher than that of cow liver were obtained by the zinc foliar spray of the present Example.

TABLE 5

| Species | Concentration of foliar-sprayed zinc (%) | Ainu-wakame extract | Zinc content in grains (mg/100 g) | Increment of zinc content in grains resulting from addition of Ainu-wakame extract (mg/100 g) |
|---|---|---|---|---|
| Suzumaru | 0 | Not added | 3.66 | — |
| Suzumaru | 0.055 | Not added | 5.90 | — |
| Suzumaru | 0.055 | Added | 6.12 | 0.22 |

TABLE 5-continued

| Species | Concentration of foliar-sprayed zinc (%) | Ainu-wakame extract | Zinc content in grains (mg/100 g) | Increment of zinc content in grains resulting from addition of Ainu-wakame extract (mg/100 g) |
|---|---|---|---|---|
| Suzumaru | 0.11 | Not added | 6.93 | — |
| Suzumaru | 0.11 | Added | 7.02 | 0.09 |
| Suzumaru | 0.22 | Not added | 6.33 | — |
| Suzumaru | 0.22 | Added | 6.45 | 0.12 |
| Toyokomachi | 0 | Not added | 3.67 | — |
| Toyokomachi | 0.055 | Not added | 6.50 | — |
| Toyokomachi | 0.055 | Added | 6.76 | 0.26 |
| Toyokomachi | 0.11 | Not added | 7.25 | — |
| Toyokomachi | 0.11 | Added | 7.36 | 0.11 |
| Toyokomachi | 0.22 | Not added | 8.05 | — |
| Toyokomachi | 0.22 | Added | 8.13 | 0.08 |

Example 6

A kidney bean species, "Taisho Kintoki," was cultivated in the field of Shimizu-cho, Kamikawa-gun, Hokkaido. The basal fertilization was carried out according to the standards for fertilization described in the "Hokkaido Fertilization Guide" (Hokkaido Agricultural Policy Planning Department Edition, 2002, Hokkaido Agricultural Development and Extension Association Corporation). Seed sowing was performed on 27th, May. The density of planting was 66 cm×20 cm, with two individual plants per one planting. On 10th, July, which time was corresponding to the flowering stage, and on 2nd, August, which time was corresponding to the stage of pod development, a 160-fold dilution of the zinc-containing Ainu-wakame extract disclosed in Preparation Example 1 (0.31% in terms of zinc concentration) added with 0.1% of Approach BI (manufactured by Kao Corporation), a spreading agent containing polyoxyethylene hexitan fatty acid esters, was foliar-sprayed at a rate of 800 L/ha. The test was repeated twice for each treatment.

Sampling was performed on 26th, August, which time was corresponding to the harvesting stage, and the obtained grains were ground and measured for the zinc content in the same manners as in Example 1.

The results are presented in Table 6. The zinc content in the grains was increased by 31% through the treatment of the present Example.

TABLE 6

| Species | Concentration of foliar-sprayed zinc (%) | Number of spraying | Zinc content in grains (mg/100 g) | Ratio with respect to untreated section (%) |
|---|---|---|---|---|
| Taisho Kintoki | 0 | 0 | 2.62 | 100 |
| Taisho Kintoki | 0.055 | 2 | 3.42 | 131 |

Example 7

A kidney bean species, "Himetebou," was cultivated in the field of Shimizu-cho, Kamikawa-gun, Hokkaido. The basal fertilization was carried out according to the standards for fertilization described in the "Hokkaido Fertilization Guide" (Hokkaido Agricultural Policy Planning Department Edition, 2002, Hokkaido Agricultural Development and Extension Association Corporation). Seed sowing was performed on 24th, May. The density of planting was 66 cm×20 cm, with two individual plants per one planting. On 10th, of July, which time was corresponding to the flowering stage, and on 2nd, August, which time was corresponding to the stage of pod development, a 200-fold dilution of the zinc-containing Ainu-wakame extract disclosed in Preparation Example 1 (0.25% in terms of zinc concentration) added with 0.1% of Approach BI (manufactured by Kao Corporation), a spreading agent containing polyoxyethylene hexitan fatty acid esters, was foliar-sprayed at a rate of 1,000 L/ha. The test was repeated twice for each treatment.

Sampling was performed on 26th, August, which time was corresponding to the harvesting stage, and the obtained grains were ground and measured for the zinc content in the same manners as in Example 1.

The results are presented in Table 7. The zinc content in the grains was increased by 33% through the treatment of the present Example.

TABLE 7

| Species | Concentration of foliar-sprayed zinc (%) | Number of spraying | Zinc content in grains (mg/100 g) | Ratio with respect to untreated section (%) |
|---|---|---|---|---|
| Himetebou | 0 | 0 | 2.53 | 100 |
| Himetebou | 0.055 | 2 | 3.36 | 133 |

Example 8

A soybean species, "Toyokomachi," was cultivated in the field of Tsubetsu-cho, Abashiri-gun, Hokkaido. The basal fertilization was carried out according to the standards for fertilization described in the "Hokkaido Fertilization Guide" (Hokkaido Agricultural Policy Planning Department Edition, 2002, Hokkaido Agricultural Development and Extension Association Corporation). Seed sowing was performed on 21st, May. The density of planting was 66 cm×20 cm, with two individual plants per one planting. On 7th, 13th and 20th, August, which times were corresponding to the stage of pod development, a 167-fold dilution of the zinc-containing Ainu-wakame extract disclosed in Preparation Example 1 (0.3% in terms of zinc concentration) added with 0.1% of Approach BI (manufactured by Kao Corporation), a spreading agent containing polyoxyethylene hexitan fatty acid esters, was foliar-sprayed at a rate of 1,200 L/ha. The test was repeated twice for each treatment.

Sampling was performed on 6th, October, which time was corresponding to the harvesting stage, and the obtained grains were ground and measured for the zinc content in the same manners as in Example 1.

The results are presented in Table 8. The zinc content in the grains was increased to 2.5 times through the treatment of the present Example. In addition, the average zinc content in cow liver is considered to be 3.8 mg/100 g according to the "Tables of Food Composition, Fifth Revised, 2003," and from this point of view, it is proved that soybean grains having a zinc content 2.2 times or more higher than that of cow liver were obtained by the zinc foliar spray of the present Example.

TABLE 8

| Species | Concentration of foliar-sprayed zinc (%) | Number of spraying | Zinc content in grains (mg/100 g) | Ratio with respect to untreated section (%) |
|---|---|---|---|---|
| Toyokomachi | 0 | 0 | 3.36 | 100 |
| Toyokomachi | 0.066 | 3 | 8.47 | 252 |

Example 9

Results of Suppressing Yield Reduction by Increasing Density of Planting

Soybean species, "Suzumaru" and "Toyokomachi," were cultivated in the experimental field belonging to the Hokkaido Research Farm of Snow Brand Seed Co., Ltd. in Naganuma-cho, Hokkaido. For the basal fertilization, 24 kg/ha of nitrogen, 150 kg/ha of phosphate, 56 kg/ha of potassium and 20 kg/ha of magnesium were applied. The densities of planting were 60 cm×20 cm, 60 cm×15 cm, and 60 cm×10 cm, with two individual plants per one planting, and the sections were designated as standard section, densely planted section, and twice densely planted section, respectively (the densities of planting were 166,667 individuals/ha, 222,222 individuals/ha, and 333,333 individuals/ha, respectively). Seed sowing was performed on 24th, May. During cultivation, on 30th, July, which time was corresponding to the flowering stage, and on 9th, August and 23rd, August, which times were corresponding to the stage of pod development, 0.5% and 1% aqueous solutions of the zinc-containing Ainu-wakame extract disclosed in Preparation Example 1 (0.055% and 0.11%, respectively, in terms of zinc concentration) added with 0.1% of Approach BI (manufactured by Kao Corporation), a spreading agent containing polyoxyethylene hexitan fatty acid esters, were foliar-sprayed at a rate of 150 mL/m$^2$. Foliar spray was performed using a knapsack power sprayer, SHR061 (manufactured by Kioritz Corporation, Ltd.), such that a sufficient amount of the liquid agent could reach evenly to the raceme region. The test was repeated twice for each treatment.

Sampling was performed on 3rd, October, which time was corresponding to the harvesting stage, by harvesting from 5 m$^2$ each of the treated sections. The plants were air-dried, and then the grains were separated using a threshing machine. The obtained grains were ground and measured for the zinc content in the same manners as in Example 1.

The results are presented in Table 9. When compared with the standard section for the density of planting, the zinc content in the grains was increased by the zinc treatment, but the yield was decreased. However, even for such zinc-treated sections, it was clear that the degree of reduction in yield per area could be decreased to a certain extent, by increasing the density of planting.

TABLE 9

| Species | Concentration of foliar-sprayed zinc (%) | Density of planting | Zinc content in grains (mg/100 g) | Yield (kg/ha) | Ratio with respect to untreated standard section (%) |
|---|---|---|---|---|---|
| Suzumaru | 0 | Standard section | 3.66 | 2916 | 100 |
| Suzumaru | 0 | Densely planted section | 3.67 | 2857 | 98 |
| Suzumaru | 0 | Twice densely planted section | 3.66 | 2799 | 96 |
| Suzumaru | 0.055 | Standard section | 6.12 | 1951 | 67 |
| Suzumaru | 0.055 | Densely planted section | 6.15 | 2106 | 72 |
| Suzumaru | 0.055 | Twice densely planted section | 6.14 | 2510 | 86 |
| Suzumaru | 0.11 | Standard section | 7.20 | 498 | 17 |
| Suzumaru | 0.11 | Densely planted section | 7.18 | 534 | 18 |
| Suzumaru | 0.11 | Twice densely planted section | 7.21 | 761 | 26 |
| Toyokomachi | 0 | Standard section | 3.67 | 2508 | 100 |
| Toyokomachi | 0 | Densely planted section | 3.67 | 2482 | 99 |
| Toyokomachi | 0 | Twice densely planted section | 3.69 | 2433 | 97 |
| Toyokomachi | 0.055 | Standard section | 6.76 | 1541 | 61 |
| Toyokomachi | 0.055 | Densely planted section | 6.73 | 1655 | 66 |
| Toyokomachi | 0.055 | Twice densely planted section | 6.71 | 2108 | 84 |
| Toyokomachi | 0.11 | Standard section | 7.36 | 568 | 23 |
| Toyokomachi | 0.11 | Densely planted section | 7.31 | 618 | 25 |

TABLE 9-continued

| Species | Concentration of foliar-sprayed zinc (%) | Density of planting | Zinc content in grains (mg/100 g) | Yield (kg/ha) | Ratio with respect to untreated standard section (%) |
| --- | --- | --- | --- | --- | --- |
| Toyokomachi | 0.11 | Twice densely planted section | 7.43 | 864 | 34 |

What is claimed is:

1. A method for producing grains containing 6.5 mg to 15.0 mg of zinc per 100 gr as measured in the mature grains comprising:
   selecting a *Glycine* variety that can concentrate at least 4.99 mg of zinc per 100 gr of its grains,
   spraying a solution containing a concentration of 0.1 to 2% by weight of soluble zinc on foliage, leaves, or raceme regions of said *Glycine* variety at or after the flower bud stage of the *Glycine* variety, and
   recovering *Glycine* grains containing 6.5 mg to 15.0 mg of zinc per 100 gr as measured in the mature grains;
   wherein said grains contain more zinc than grains of an identical plant not sprayed with the soluble zinc solution grown on the same soil; and
   wherein said grains are field-grown.

2. The method of claim 1, wherein said *Glycine* variety can concentrate at least 5.5 mg of zinc per 100 gr of its grains.

3. The method of claim 1, wherein said *Glycine* variety is *Glycine max*.

4. The method of claim 1, wherein said *Glycine* variety is *Glycine soja*.

5. The method of claim 1, wherein said *Glycine* variety is *Glycine formosana*.

6. The method of claim 1, wherein said solution contains zinc sulfate.

7. The method of claim 1, wherein said solution contains zinc chloride, zinc nitrate, zinc formate, zinc acetate, and/or chelated zinc.

8. The method of claim 1, wherein said solution further comprises a seaweed extract.

9. The method of claim 1, wherein a spray amount of the solution containing the soluble zinc is 1,000 liters or more per hectare.

10. The method of claim 1, wherein the spraying of the solution containing the soluble zinc is performed, starting from the flower bud stage, at an interval of 1 to 2 weeks.

11. The method of claim 1, wherein said spraying solution contains 0.1 to 0.5% by weight zinc.

* * * * *